(12) United States Patent
Gartner

(10) Patent No.: US 9,547,352 B2
(45) Date of Patent: Jan. 17, 2017

(54) PRESENCE-BASED POWER MANAGEMENT

(75) Inventor: Jeffrey G. Gartner, Hopewell Junction, NY (US)

(73) Assignee: Avaya Inc., Basking Ridge, NJ (US)

( * ) Notice: Subject to any disclaimer, the term of this patent is extended or adjusted under 35 U.S.C. 154(b) by 1040 days.

(21) Appl. No.: 12/241,958

(22) Filed: Sep. 30, 2008

(65) Prior Publication Data

US 2010/0082175 A1   Apr. 1, 2010

(51) Int. Cl.
   *G06F 1/32*       (2006.01)
   *G06F 3/01*       (2006.01)

(52) U.S. Cl.
   CPC ............ *G06F 1/3203* (2013.01); *G06F 1/3231* (2013.01); *G06F 3/011* (2013.01); *G06F 2203/011* (2013.01); *Y02B 60/1289* (2013.01)

(58) Field of Classification Search
   CPC ...... G06F 1/3203; G06F 1/3231; G06F 3/011; G06F 2203/011; Y02B 60/1289
   USPC ....... 700/22, 11, 295, 65, 297, 286; 340/657
   See application file for complete search history.

(56) References Cited

U.S. PATENT DOCUMENTS

| | | | | |
|---|---|---|---|---|
| 4,761,540 A | * | 8/1988 | McGeorge | 219/506 |
| 4,918,293 A | * | 4/1990 | McGeorge | 219/506 |
| 5,086,385 A | * | 2/1992 | Launey | G06F 3/04847 340/6.11 |
| 5,544,036 A | * | 8/1996 | Brown et al. | 700/277 |
| 5,761,083 A | * | 6/1998 | Brown et al. | 700/296 |
| 5,875,108 A | * | 2/1999 | Hoffberg et al. | 700/83 |
| 5,901,246 A | * | 5/1999 | Hoffberg et al. | 382/209 |
| 6,081,750 A | * | 6/2000 | Hoffberg et al. | 700/86 |
| 6,400,996 B1 | * | 6/2002 | Hoffberg et al. | 700/83 |
| 6,418,424 B1 | * | 7/2002 | Hoffberg et al. | 706/21 |
| 6,611,206 B2 | * | 8/2003 | Eshelman et al. | 340/573.1 |
| 6,640,145 B2 | * | 10/2003 | Hoffberg et al. | 700/83 |
| 6,671,586 B2 | * | 12/2003 | Davis et al. | 700/295 |
| 6,784,775 B2 | * | 8/2004 | Mandell et al. | 335/206 |
| 6,832,135 B2 | * | 12/2004 | Ying | 700/295 |
| 6,834,195 B2 | * | 12/2004 | Brandenberg et al. | 455/456.3 |
| 6,850,252 B1 | * | 2/2005 | Hoffberg | 715/716 |
| 6,856,236 B2 | * | 2/2005 | Christensen et al. | 340/3.5 |
| 6,879,806 B2 | * | 4/2005 | Shorty | 455/11.1 |

(Continued)

FOREIGN PATENT DOCUMENTS

WO    WO 2008155545 A2 * 12/2008 ............... G01D 4/00

OTHER PUBLICATIONS

Domia Lifestyle, "2007 Cataloge and Brochure", 2007, retrieved from the Internet on Feb. 6, 2012 at www.domialifestyle.com/documentation.asp.*

(Continued)

*Primary Examiner* — Mohammad Ali
*Assistant Examiner* — Kelvin Booker

(57) ABSTRACT

The illustrative embodiment describes a system that manages the energy usage of a user's appliance based on: (i) the user's location, and (ii) the user's "presence information." The "presence information" of a user is defined as a status indicator that includes, but is not limited to: the ability and willingness of a user to communicate and a user's mood. For example, when a user is lonely and at work, the office door should open, but when the user is not lonely and at work, the user's instant messages should be shut off. The illustrative embodiment comprises: an appliance; and an energy-usage controller for de-activating an energy-consuming element of the appliance based on presence information of a user of the appliance.

22 Claims, 5 Drawing Sheets

System 100

(56) References Cited

U.S. PATENT DOCUMENTS

| | | | |
|---|---|---|---|
| 6,898,299 B1* | 5/2005 | Brooks | 382/115 |
| 6,961,410 B1* | 11/2005 | Castagna | 379/88.23 |
| 6,975,926 B2* | 12/2005 | Schanin | 700/296 |
| 6,980,080 B2* | 12/2005 | Christensen et al. | 340/3.5 |
| 7,002,442 B2 | 2/2006 | Mandell et al. | 392/385 |
| 7,006,881 B1* | 2/2006 | Hoffberg et al. | 700/83 |
| 7,031,875 B2* | 4/2006 | Ellenby et al. | 702/150 |
| 7,082,339 B2* | 7/2006 | Murray et al. | 700/83 |
| 7,092,772 B2* | 8/2006 | Murray et al. | 700/83 |
| 7,136,710 B1* | 11/2006 | Hoffberg et al. | 700/83 |
| 7,139,716 B1* | 11/2006 | Gaziz | 704/275 |
| 7,206,670 B2* | 4/2007 | Pimputkar et al. | 700/291 |
| 7,451,005 B2* | 11/2008 | Hoffberg et al. | 700/83 |
| 7,570,975 B2* | 8/2009 | Oprescu-Surcobe et al. | 455/574 |
| 7,786,623 B2 | 8/2010 | Farmer et al. | 307/117 |
| 7,813,822 B1* | 10/2010 | Hoffberg | 700/94 |
| 7,904,074 B2* | 3/2011 | Karaoguz et al. | 455/420 |
| 7,904,187 B2* | 3/2011 | Hoffberg et al. | 700/83 |
| 7,937,417 B2* | 5/2011 | Seymour | 707/805 |
| 7,953,678 B2* | 5/2011 | Hunter | 706/12 |
| 7,966,078 B2* | 6/2011 | Hoffberg et al. | 700/17 |
| 7,974,714 B2* | 7/2011 | Hoffberg | 700/94 |
| 7,987,003 B2* | 7/2011 | Hoffberg et al. | 700/17 |
| 8,031,060 B2* | 10/2011 | Hoffberg et al. | 340/426.16 |
| 8,264,226 B1* | 9/2012 | Olsson et al. | 324/329 |
| 2001/0048589 A1* | 12/2001 | Brandenberg et al. | 361/683 |
| 2004/0032393 A1* | 2/2004 | Brandenberg et al. | 345/156 |
| 2005/0043060 A1* | 2/2005 | Brandenberg et al. | 455/558 |
| 2005/0221807 A1* | 10/2005 | Karlsson | H04M 3/42 455/418 |
| 2005/0242918 A1* | 11/2005 | Van Dongen et al. | 700/11 |
| 2006/0154642 A1* | 7/2006 | Scannell, Jr. | 455/404.1 |
| 2006/0155398 A1* | 7/2006 | Hoffberg et al. | 700/86 |
| 2006/0200259 A1* | 9/2006 | Hoffberg et al. | 700/86 |
| 2006/0200260 A1* | 9/2006 | Hoffberg et al. | 700/86 |
| 2006/0288099 A1* | 12/2006 | Jefferson | H04L 12/581 709/224 |
| 2007/0016476 A1* | 1/2007 | Hoffberg et al. | 705/14 |
| 2007/0053513 A1* | 3/2007 | Hoffberg | 380/201 |
| 2007/0061735 A1* | 3/2007 | Hoffberg et al. | 715/744 |
| 2007/0070038 A1* | 3/2007 | Hoffberg et al. | 345/156 |
| 2007/0263084 A1* | 11/2007 | Misawa et al. | 348/14.08 |
| 2008/0024605 A1* | 1/2008 | Osann, Jr. | 348/143 |
| 2008/0059493 A1* | 3/2008 | Blohm | G06F 8/65 |
| 2008/0059552 A1* | 3/2008 | Blohm | H04L 67/24 709/200 |
| 2008/0065755 A1* | 3/2008 | Caspi | H04L 67/24 709/224 |
| 2008/0183651 A1* | 7/2008 | Hunter | G06F 3/002 706/47 |
| 2008/0218148 A1* | 9/2008 | Robertson et al. | 323/349 |
| 2008/0231468 A1* | 9/2008 | Myllymaki | 340/870.17 |
| 2008/0255782 A1* | 10/2008 | Bilac et al. | 702/62 |
| 2009/0019532 A1* | 1/2009 | Jacobsen | H04L 12/5895 726/5 |
| 2009/0027068 A1* | 1/2009 | Philipp et al. | 324/678 |
| 2009/0117936 A1* | 5/2009 | Maeng | H04M 1/72547 455/550.1 |
| 2009/0147008 A1* | 6/2009 | Do | A63F 13/12 345/473 |
| 2009/0195704 A1* | 8/2009 | Bombara | 348/734 |
| 2009/0234512 A1* | 9/2009 | Ewing et al. | 700/295 |
| 2009/0275314 A1* | 11/2009 | Cotevino | H04L 12/5815 455/414.2 |
| 2010/0022279 A1* | 1/2010 | Hoberg | H04M 3/02 455/567 |
| 2010/0025483 A1* | 2/2010 | Hoeynck et al. | 236/1 C |
| 2010/0057875 A1* | 3/2010 | Bychkov et al. | 709/206 |
| 2010/0060477 A1* | 3/2010 | Laasik et al. | 340/825.69 |
| 2010/0063644 A1* | 3/2010 | Kansal et al. | 700/295 |
| 2010/0153453 A1* | 6/2010 | Knowles | 707/784 |
| 2010/0218010 A1* | 8/2010 | Musti et al. | 713/310 |
| 2010/0235453 A1* | 9/2010 | Attanasio | H04L 12/581 709/206 |
| 2010/0282847 A1* | 11/2010 | Lei et al. | 235/438 |
| 2010/0289643 A1* | 11/2010 | Trundle et al. | 340/545.1 |
| 2011/0026436 A1* | 2/2011 | Karaoguz et al. | 370/254 |
| 2011/0035404 A1* | 2/2011 | Morgan et al. | 707/769 |
| 2011/0156896 A1* | 6/2011 | Hoffberg et al. | 340/506 |
| 2011/0167110 A1* | 7/2011 | Hoffberg et al. | 709/203 |
| 2011/0252248 A1* | 10/2011 | Cameron et al. | 713/300 |
| 2012/0190386 A1* | 7/2012 | Anderson | 455/456.3 |

* cited by examiner

PRESENCE-BASED POWER MANAGEMENT

FIELD OF THE INVENTION

The present invention relates to energy management in general, and, more particularly, to the use of location and presence information to manage energy-consuming elements.

BACKGROUND OF THE INVENTION

Energy is expensive, and, therefore, the need exists for more energy-efficient products.

SUMMARY OF THE INVENTION

The present invention provides a technique for energy management that avoids some of the costs and disadvantages of the prior art. For example, the illustrative embodiment manages the energy usage of a user's appliance based on: (i) the user's location, and (ii) the user's "presence information."

For the purposes of this specification, the "presence information" of a user is defined as a status indicator that includes, but is not limited to: the ability and willingness of a user to communicate and a user's mood.

In accordance with the illustrative embodiment, when a user is lonely and at work, the office door should open, but when the user is not lonely and at work, the user's instant messages should be shut off. Similarly, when a user is at home and lonely, the user's robot dog should activate, but when the user is at home and not lonely, the robot dog should return to its charging base.

Also in accordance with the illustrative embodiment, if a user is at home and is bored, the user's television should turn on, but if the user is at home and not bored, the television should do nothing—the television should neither activate if it is off nor should it de-activate if it is on. If the user is away from home and is bored, the user's portable music player should activate, but if the user is away from home and is not bored, the portable music player should do nothing.

The illustrative embodiment comprises: an appliance; and an energy-usage controller for de-activating an energy-consuming element of the appliance based on presence information of a user of the appliance.

DETAILED DESCRIPTION

Figure 1:
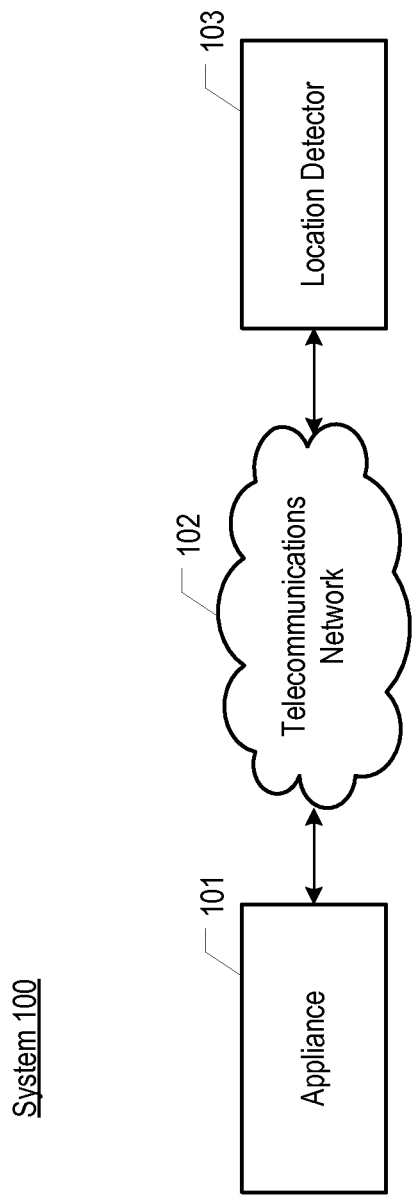
FIG. 1 depicts a schematic diagram of a portion of system 100 in accordance with the illustrative embodiment of the present invention.

FIG. 1 depicts a schematic diagram of a portion of system 100 in accordance with the illustrative embodiment of the present invention. System 100 is comprised of appliance 101, network 102, and location detector 103 interconnected as shown. While FIG. 1 has one appliance, it will be clear to one skilled in the art, after reading this disclosure, how to make and use system 100 with any number of appliances. While FIG. 1 has one location detector, it will be clear to one skilled in the art, after reading this disclosure, how to make and use system 100 with any number of location detectors.

Figure 2:
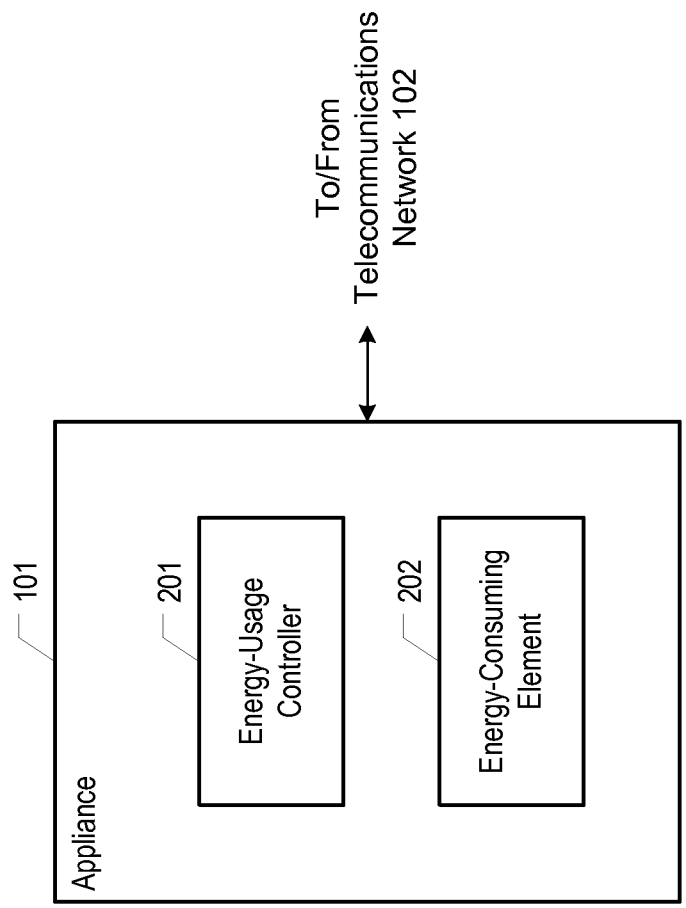
FIG. 2 depicts a schematic diagram of appliance 101 in accordance with the illustrative embodiment of the present invention.

FIG. 2 depicts a schematic diagram of appliance 101 in accordance with the illustrative embodiment of the present invention. Appliance 101 comprises energy-usage controller 201 and energy-consuming element 202. While appliance 101 has one energy-usage controller and one energy-consuming element, it will be clear to one skilled in the art, after reading this disclosure how to make and use appliance 101 with any number of energy-usage controllers and energy-consuming elements.

Figure 3:
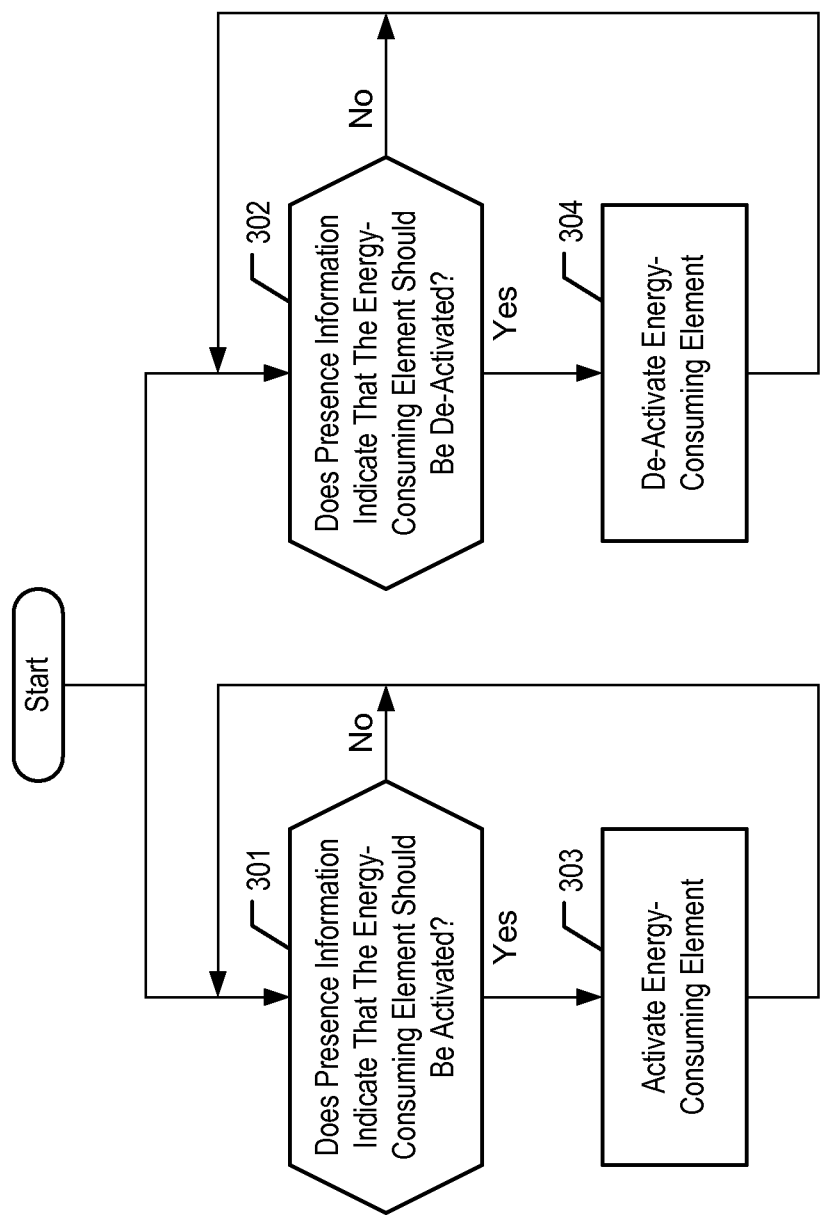
FIG. 3 depicts a flowchart of the salient tasks associated with the operation of the illustrative embodiment of the present invention.

FIG. 3 depicts a flowchart of the salient tasks associated with the operation of the illustrative embodiment of the present invention. It will be clear to those skilled in the art, after reading this disclosure, how to make and use alternative embodiments of the present invention in which some or all of the tasks in FIG. 3 are performed simultaneously or in a different order from that depicted.

At task 301, appliance 101 has received presence information from location detector 103 and energy-usage controller 201 and determines whether the information provided by location detector 103 indicates whether energy-consuming element 202 should be activated.

At task 302, appliance 101 has received presence information from location detector 103 and energy-usage controller 201 and determines whether the information provided by location detector 103 indicates whether energy-consuming element 202 should be de-activated.

At task 303, energy-consuming element 202 is activated.

At task 304, energy-consuming element 202 is de-activated.

Figure 4:
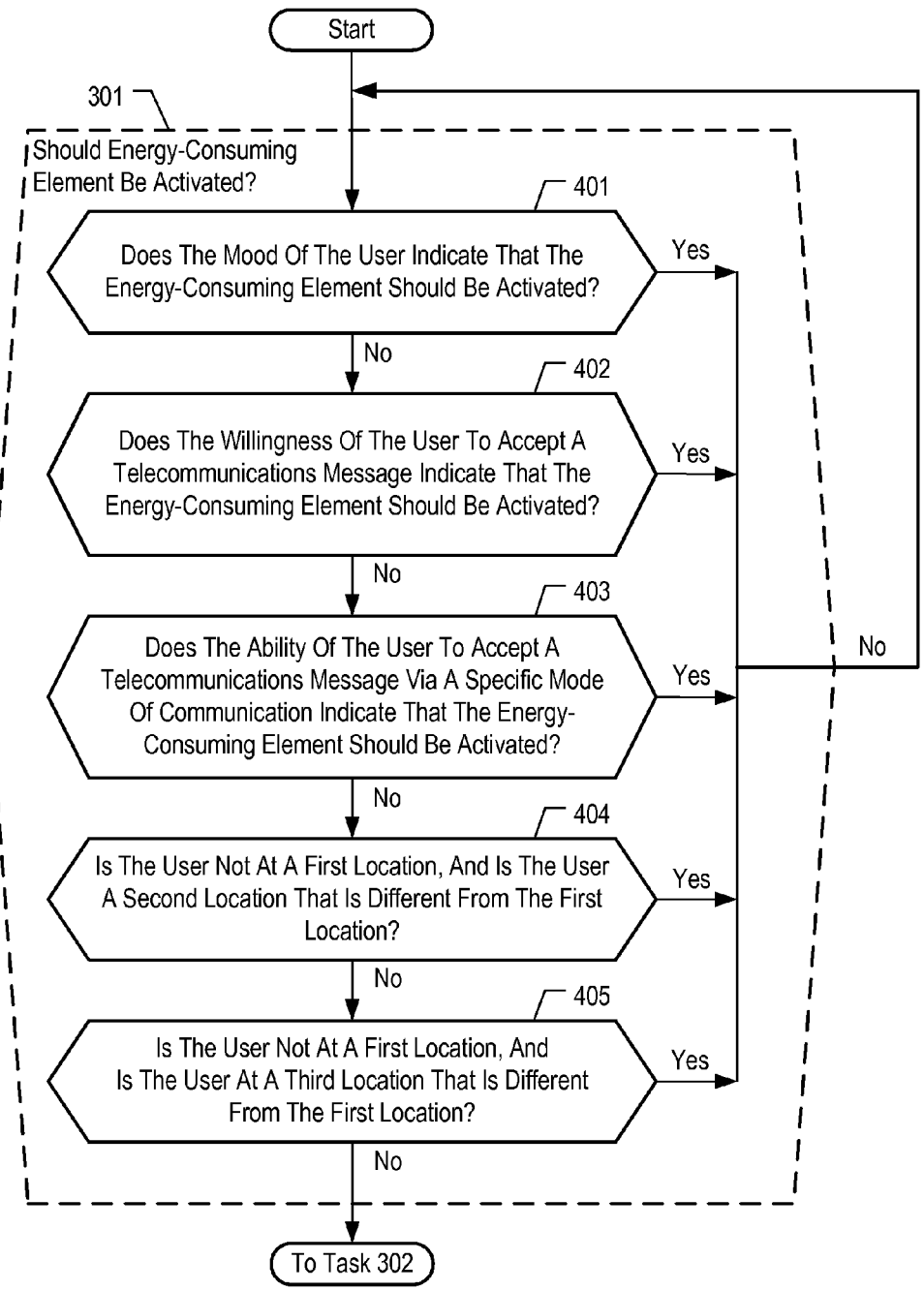
FIG. 4 depicts a flowchart of the salient tasks associated with task 301.

FIG. 4 depicts a flowchart of the salient tasks associated with task 301. It will be clear to those skilled in the art, after reading this disclosure, how to make and use alternative embodiments of the present invention in which some or all of the tasks in FIG. 4 are performed simultaneously or in a different order from that depicted.

At task 401, energy-usage controller 201 determines whether the mood of the user indicates whether energy-consuming element 202 should be activated.

Some examples of mood include, but are not limited to: afraid, amazed, angry, annoyed, anxious, ashamed, bored, brave, calm, cold, confused, contented, cranky, curious, depressed, disappointed, disgusted, distracted, embarrassed, excited, flirtatious, frustrated, grumpy, guilty, happy, hot, humbled, humiliated, hungry, hurt, impressed, in_awe, in_love, indignant, interested, invincible, jealous, lonely, mean, moody, nervous, neutral, offended, other, playful, proud, relieved, remorseful, restless, sad, sarcastic, serious, shocked, shy, sick, sleepy, stressed, surprised, thirsty, unknown, and worried.

At task 402, energy-usage controller 201 determines whether the willingness of the user to accept a telecommunications message of the user indicates whether energy-consuming element 202 should be activated.

At task 403, energy-usage controller 201 determines whether the ability of the user to accept a telecommunications message via a specific mode of communication indicates whether energy-consuming element 202 should be activated. For example, a user may not be available via telephone if they are currently using the telephone, but may still be available via instant message or e-mail.

At task 404, energy-usage controller 201 determines whether the user not at a first location, and if the user a second location that is different from the first location.

At task 405, energy-usage controller 201 determines whether the user not at a first location, and if the user at a third location that is different from the first location.

Figure 5:
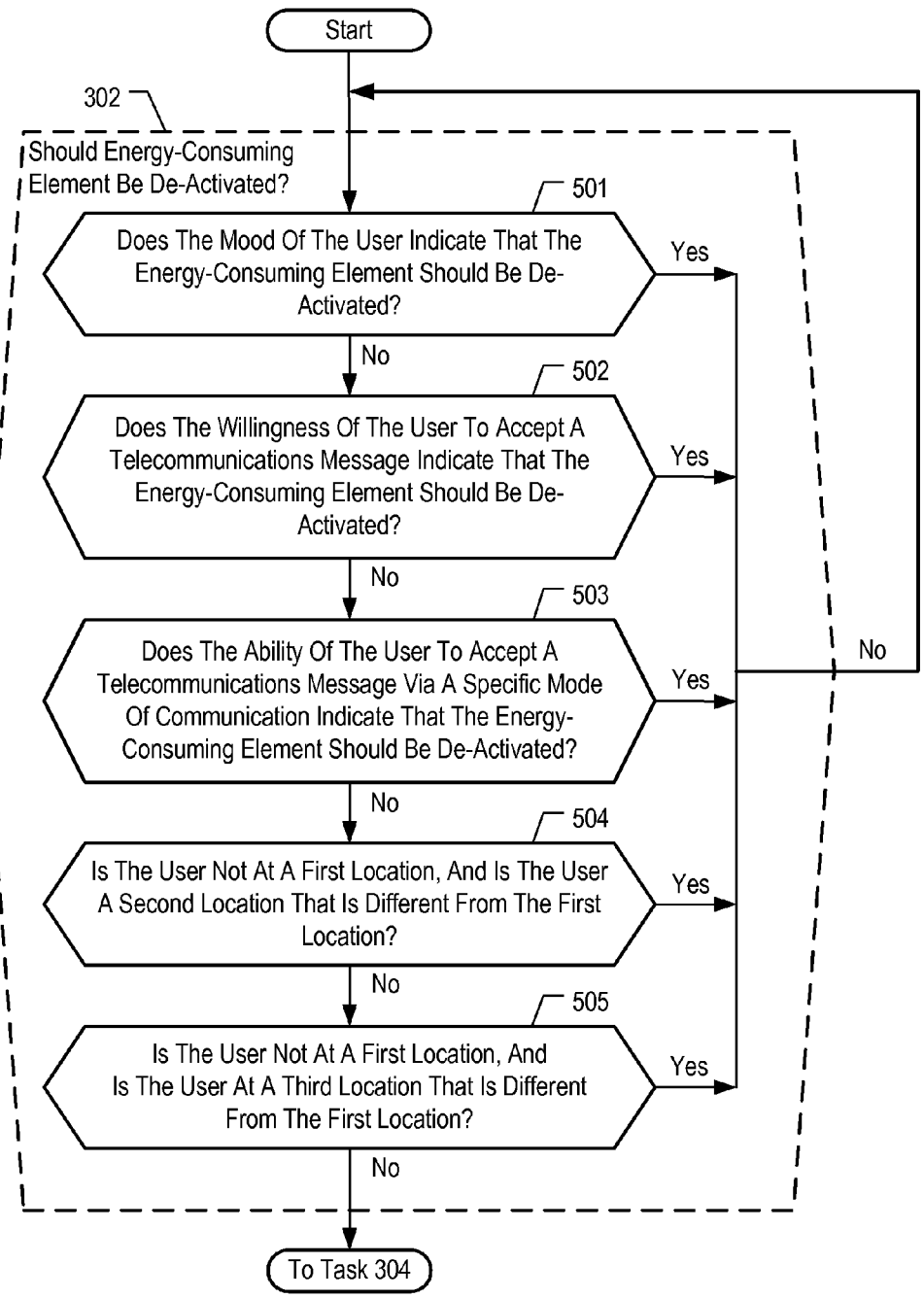
FIG. 5 depicts a flowchart of the salient tasks associated with task 302.

FIG. 5 depicts a flowchart of the salient tasks associated with task 302. It will be clear to those skilled in the art, after reading this disclosure, how to make and use alternative embodiments of the present invention in which some or all of the tasks in FIG. 5 are performed simultaneously or in a different order from that depicted.

At task 501, energy-usage controller 201 determines whether the mood of the user indicates whether energy-consuming element 202 should be de-activated.

At task 502, energy-usage controller 201 determines whether the willingness of the user to accept a telecommunications message of the user indicates whether energy-consuming element 202 should be de-activated.

At task 503, energy-usage controller 201 determines whether the ability of the user to accept a telecommunications message via a specific mode of communication indicates whether energy-consuming element 202 should be de-activated.

At task 504, energy-usage controller 201 determines whether the user not at a first location, and if the user a second location that is different from the first location.

At task 505, energy-usage controller 201 determines whether the user not at a first location, and if the user at a third location that is different from the first location.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An appliance comprising:
a connection to a telecommunications network;
an energy-consuming element; and
an energy-use controller for performing at least one of: (i) de-activating the energy consuming element and (ii) activating the energy-consuming element, wherein the performing is based on (A) a location of a user relative to the location of the appliance, and (B) a presence information about the user, wherein the presence information comprises a mood of the user and further comprises at least one of a willingness of the user to accept a telecommunications message from the telecommunications network, and an ability of the user to accept the telecommunications message via a specific mode of communication.

2. The appliance of claim 1 wherein the appliance is a telecommunications terminal.

3. The appliance of claim 1 wherein a telecommunications terminal that is associated with the user transmits the presence information to the appliance.

4. The appliance of claim 1 wherein the energy-use controller is adapted to determine whether the mood of the user indicates whether the energy-consuming element should be one of (i) activated and (ii) de-activated.

5. The appliance of claim 1 wherein the energy-use controller is adapted to determine whether the willingness of the user to accept the telecommunications message from the telecommunications network indicates whether the energy-consuming element should be one of (i) activated and (ii) de-activated.

6. The appliance of claim 1 wherein the energy-use controller is adapted to determine whether the ability of the user to accept the telecommunications message via a specific mode of communication indicates whether the energy-consuming element should be one of (i) activated and (ii) de-activated.

7. The appliance of claim 1 wherein the location of the user of the appliance is deduced at least in part based on the presence information about the user.

8. A method comprising:
establishing, by an appliance, a connection to a telecommunications network, wherein the appliance comprises an energy-consuming element and an energy-use controller;
performing, by the energy-use controller, at least one of: (i) de-activating the energy-consuming element and (ii) activating the energy-consuming element, wherein the performing is based on (A) a location of a user relative to the location of the appliance, and (B) a presence information about the user, wherein the presence information comprises a mood of the user and further comprises at least one of a willingness of the user to accept a telecommunications message from the telecommunications network, and an ability of the user to accept the telecommunications message via a specific mode of communication.

9. The method of claim 8 wherein the appliance is a telecommunications terminal.

10. The method of claim 8 further comprising:
receiving, by the appliance, the presence information from a telecommunications terminal that is connected to the telecommunications network.

11. The method of claim 8 further comprising:
determining, by the energy-use controller, whether the mood of the user indicates that the energy-consuming element should be one of (i) activated and (ii) de-activated.

12. The method of claim 8 further comprising:
determining, by the energy-use controller, whether the willingness of the user to accept the telecommunications message from the telecommunications network indicates that the energy-consuming element should be one of (i) activated and (ii) de-activated.

13. The method of claim 8 further comprising:
determining, by the energy-use controller, whether the ability of the user to accept the telecommunications message via a specific mode of communication indicates that the energy-consuming element should be one of (i) activated and (ii) de-activated.

14. The method of claim 8 wherein the location of the user of the appliance is deduced at least in part based on the presence information about the user.

15. A system comprising:
an appliance that is connected to a telecommunications network;
an energy-consuming element in the appliance; and
an energy-use controller in the appliance for performing at least one of: (i) deactivating the energy-consuming element and (ii) activating the energy-consuming element, wherein the performing is based on (A) a location of a user relative to the location of the appliance, and (B) a presence information about the user, wherein the presence information comprises a mood of the user and further comprises at least one of a willingness of the user to accept a telecommunications message from the telecommunications network, and an ability of the user to accept the telecommunications message via a specific mode of communication.

16. The system of claim 15 wherein the appliance is a telecommunications terminal.

17. The system of claim 15 wherein a telecommunications terminal that is associated with the user transmits the presence information to the appliance.

18. The system of claim 15 wherein the energy-use controller is adapted to determine whether the mood of the user indicates whether the energy-consuming element should be one of (i) activated and (ii) de-activated.

19. The system of claim 15 wherein the energy-use controller is adapted to determine whether the willingness of the user to accept the telecommunications message from the telecommunications network indicates whether the energy-consuming element should be one of (i) activated and (ii) de-activated.

20. The system of claim 15 wherein the energy-use controller is adapted to determine whether the ability of the user to accept the telecommunications message via a specific mode of communication indicates whether the energy-consuming element should be one of (i) activated and (ii) de-activated.

21. The system of claim 15 wherein the location of the user is deduced at least in part based on the presence information about the user.

22. The system of claim 15 further comprising a location detector that is connected to the telecommunications network, and that transmits the location of the user to the appliance.

* * * * *